US008438051B2

(12) United States Patent  (10) Patent No.: US 8,438,051 B2
Schweitzer et al.  (45) Date of Patent: May 7, 2013

(54) ROUNDING TO TRANSPORTATION QUANTITIES

(75) Inventors: Michael Schweitzer, Leimen (DE); Edward W. Huber, Morton, IL (US); Marlon S. McDonald, Tremont, IL (US); Michael J. Monson, Morton, IL (US); Larry M. Newbanks, Peoria, IL (US); Guenther J. Baermann, Pulheim (DE); Michael J. Czach, Canton, MI (US); Eric P. Eich, Huerth (DE); Hans Schmitz, Euskirchen (DE); Brian R. Taylor, Leamington Spa (GB); Mark Fishwick, Brighton, MI (US); Ryan G. Matthews, Livonia, MI (US)

(73) Assignee: SAP Aktiengesellschaft, Walldorf (DE)

( * ) Notice: Subject to any disclaimer, the term of this patent is extended or adjusted under 35 U.S.C. 154(b) by 2808 days.

(21) Appl. No.: 10/952,668

(22) Filed: Sep. 28, 2004

(65) Prior Publication Data

US 2006/0074728 A1  Apr. 6, 2006

(51) Int. Cl.
G06Q 10/00 (2012.01)
(52) U.S. Cl.
USPC .................. 705/7.11; 705/7.23; 358/1.17
(58) Field of Classification Search .................. 705/8, 9, 705/10, 21, 22, 28
See application file for complete search history.

(56) References Cited

U.S. PATENT DOCUMENTS

| | | | | |
|---|---|---|---|---|
| 1,921,968 A * | 8/1933 | Endacott | ......................... | 40/383 |
| 3,312,812 A * | 4/1967 | Schmitt | ......................... | 705/413 |
| 5,117,096 A * | 5/1992 | Bauer et al. | ..................... | 235/375 |
| 5,265,006 A * | 11/1993 | Asthana et al. | ..................... | 705/8 |
| 5,347,274 A * | 9/1994 | Hassett | ......................... | 340/988 |
| 5,450,317 A * | 9/1995 | Lu et al. | ......................... | 705/10 |
| 5,666,493 A * | 9/1997 | Wojcik et al. | ..................... | 705/26 |
| 5,765,143 A * | 6/1998 | Sheldon et al. | ..................... | 705/28 |
| 5,884,300 A * | 3/1999 | Brockman | ......................... | 707/2 |
| 5,946,662 A * | 8/1999 | Ettl et al. | ......................... | 705/8 |
| 6,006,196 A * | 12/1999 | Feigin et al. | ..................... | 705/10 |
| 6,085,170 A * | 7/2000 | Tsukuda | ......................... | 705/26 |
| 6,879,962 B1 * | 4/2005 | Smith et al. | ..................... | 705/22 |
| 6,937,992 B1 * | 8/2005 | Benda et al. | ..................... | 705/7 |
| 6,963,847 B1 * | 11/2005 | Kennedy et al. | ..................... | 705/8 |
| 7,028,887 B2 * | 4/2006 | Chigira et al. | ..................... | 235/376 |
| 7,171,379 B2 * | 1/2007 | Menninger et al. | ............. | 705/28 |
| 7,225,040 B2 * | 5/2007 | Eller et al. | ..................... | 700/100 |
| 7,249,044 B2 * | 7/2007 | Kumar et al. | ..................... | 705/8 |
| 2002/0016744 A1* | 2/2002 | Mitsuoka et al. | ............... | 705/26 |
| 2002/0042756 A1* | 4/2002 | Kumar et al. | ..................... | 705/26 |
| 2002/0059110 A1* | 5/2002 | Yamamoto et al. | ............. | 705/26 |
| 2002/0072923 A1* | 6/2002 | Guidry | ......................... | 705/1 |
| 2002/0087371 A1* | 7/2002 | Abendroth | ......................... | 705/7 |
| 2002/0103709 A1* | 8/2002 | Anthony et al. | ................ | 705/22 |
| 2002/0156642 A1* | 10/2002 | Aida | ......................... | 705/1 |
| 2003/0014288 A1* | 1/2003 | Clarke et al. | ..................... | 705/7 |
| 2003/0061102 A1* | 3/2003 | Menninger et al. | ............. | 705/22 |
| 2003/0090722 A1* | 5/2003 | Eller et al. | ..................... | 358/1.17 |
| 2003/0149638 A1* | 8/2003 | Itou et al. | ......................... | 705/26 |

(Continued)

Primary Examiner — Gurkanwaljit Singh
(74) Attorney, Agent, or Firm — Blakely, Sokoloff, Taylor & Zafman LLP

(57) ABSTRACT

A method and apparatus to efficiently round requested quantities to efficient transportation quantities in the supply chain. Target locations are organized in a sequence. A tolerance interval around the requested quantity is calculated for each target location. The requested value is then rounded to an efficient transportation quantity for each target location in its sequential order.

14 Claims, 6 Drawing Sheets

U.S. PATENT DOCUMENTS

| | | | |
|---|---|---|---|
| 2003/0204463 A1* | 10/2003 | Mitsukuni et al. | 705/36 |
| 2003/0204468 A1* | 10/2003 | Mitsukuni et al. | 705/38 |
| 2004/0054570 A1* | 3/2004 | Streetman | 705/8 |
| 2004/0103047 A1* | 5/2004 | Park et al. | 705/28 |
| 2004/0172344 A1* | 9/2004 | Stockwell et al. | 705/28 |
| 2004/0210489 A1* | 10/2004 | Jackson et al. | 705/22 |
| 2004/0217162 A1* | 11/2004 | Chigira et al. | 235/379 |
| 2004/0220845 A1* | 11/2004 | Malapitan | 705/8 |

* cited by examiner

ROUNDING TO TRANSPORTATION QUANTITIES

BACKGROUND

1. Field of the Invention

The invention relates to supply chain management. More specifically, the invention relates to selection of efficient quantities for distribution in a supply network.

2. Background

A typical supply network may include multiple levels. For example, there may be a plant at the top of the network with a plurality of distribution centers at a second level followed by a number of end use locations, such as, retail establishments at a third level down. It should be understood that supply networks may have more or fewer levels than three. It should also be understood that where a location falls in the supply chain will vary depending on the product at issue. For example, the plant may be the "end use" target location for parts it assembles into other products. Other supply chains model only a portion with total supply chain. For example, some supply chains may only model distribution centers without modeling the end use client.

The supply chain management process includes several discrete operations. At a first stage, the demand at each target location in the network is forecast. In a second stage, inventory planning is undertaken to calculate, for example, economic order quantities and safety stock required at the various locations. Distribution resource planning (DRP) then uses the forecast, inventory planning and any special requirements of the various target locations to calculate the net demands. Deployment is typically performed on a level by level basis. A source makes the deployment decision for each of its target locations based on the net demands calculated by DRP. Thus, the supply chain network described above, the plant would make deployment decisions to each of its distribution centers, and the distribution center would each make deployment decisions to their respective associated target locations. Deployment has typically been carried out by selecting the net demand calculated in the DRP process and shipping the nearest whole unit to the requesting target location. This can result in shipment of many individual pieces or smaller size lots which carry higher per unit transportation costs.

SUMMARY

A method and apparatus to efficiently round requested quantities to efficient transportation quantities in the supply chain is disclosed. A tolerance interval around the requested quantity is calculated for each target location. The requested value is then rounded to an efficient transportation quantity for each target location.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
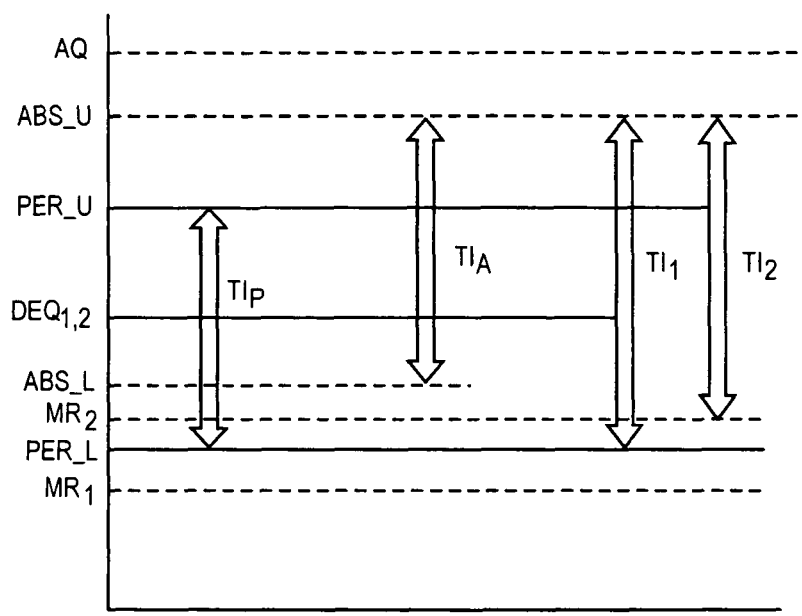
FIG. 1 is a chart depicting an establishment of tolerance intervals for two target locations in one embodiment of the invention.

Items moving in a supply chain are frequently available in various unit quantities referred to herein as "pack stages". For example, pack stages may include a single piece, a carton (ten pieces), a pallet layer (100 cartons, 1000 pieces), a pallet (10 pallet layers, 1000 cartons, 10,000 pieces). Other pack stages are of course possible and contemplated. Moreover, the number of pieces in the various stages will likely differ from a product to the next. It is also true that different pack stages may apply for different target locations having the same source. Generally, higher quantity pack stages ("higher" pack stages) are more efficient in terms of handling at a supplier or packager, as well as in transportation and warehousing. As used herein "requested" and "desired" quantities are used interchangeably to mean an amount to be sent to a target location as a result of supply chain activity independent of any rounding for efficient shipment. This requested quantity may be in one embodiment the result of a traditional distribution resource planning (DRP) operation. In another embodiment, it may be a quantity explicitly requested by a target location. By converting unrounded requested/desired quantities for each target location to multiples of pack stages and particularly as high a pack stage as possible to significantly reduce transportation and handling costs within the supply chain network.

As a precursor to rounding, a tolerance interval around a requested quantity is defined. This indicates the amount of overshipping or undershipping permitted by the target location. The tolerance interval may, in one embodiment be defined as a percentage higher or lower than the desired quantity. For example, the shipping quantity may be permitted to be 10% higher or 15% lower than the desired quantity. From this example, it should be clear that the percentage of overshipping need not be the same as the percentage permitted under shipping. Also, some embodiments allow a 0% value for one or both limits of the percentage tolerance intervals. A 0% value indicates the rounding, e.g., up in the case of a 0% upper limit should not occur. In another embodiment, an absolute tolerance interval may be used. For example, thirty pieces more than the desired quantity or twenty-five pieces less than desired may be shipped. In some embodiments, a combination of absolute and percentage may define the tolerance interval. While the tolerance interval will vary with the requested quantity (RQ), a tolerance interval definition may be consistently applied to yield the tolerance interval. In the percentage example above, the tolerance interval definition would be TI=RQ(0.85) to RQ(1.1). In one embodiment, two other constraints may affect the tolerance interval. A mandatory shipping requirement (MR) for the target location may provide an absolute minimum or lower bound for possible tolerance interval while the quantity available provides an upper bound. It is clearly not possible to ship more than the quantity available (QA) to any target location since QA is defined as the total quantity available from the source for distribution to all target locations. In some embodiments, MR and QA are regarded as hard constraints while the other source of bounds for the tolerance interval are considered soft constraints as discussed more fully below. The tolerance interval definition becomes more complex when absolute and percentage intervals are combined and when additional hard constraints are introduced. For example, one TI definition may be TI=the greatest of (MR or least of (0.85 RQ and (RQ−25))) to the least of (AQ or the greatest of (1.1 RQ and (RQ+30))).

FIG. 1 is a chart depicting an establishment of tolerance intervals for two target locations in one embodiment of the invention. In this example, to simplify the figure for explanation purposes, we have assumed that both target locations have the same desired quantity ($DEQ_1=DEQ_2=DEQ_{1,2}$). Further we have assumed that the percentage tolerance interval $TI_P$ defined by upper percentage tolerance limit PER_U and lower percentage tolerance limit PER_L is the same for both target locations. Similarly, the absolute tolerance interval $TI_A$ defined by lower limit ABS_L and upper limit ABS_U is again the same for both target locations. However, the first target location ($TL_1$) has mandatory requirement ($MR_1$) and the second target location ($TL_2$) mandatory requirement ($MR_2$). To provide the broadest possible rounding scope, it is desirable to choose the extremes of the absolute and percentage tolerance intervals. In this example, by using the absolute upper limit, ABS_U and the percentage lower limit PER_L, the tolerance interval for target one ($TI_1$) is made wider than either $TI_P$ or $TI_A$ alone. Notably, because the mandatory requirement $MR_1$ is below the lowest of the percentage and absolute tolerance limits, it does not affect the tolerance interval $TI_1$. However, because the mandatory requirement $MR_2$ provides a floor for minimum shipping requirements, it serves as the lower bound for the tolerance interval for target location two ($TI_2$) while the upper limit ABS_U serves as the upper bound. Since the available quantity (AQ) is outside either the $TI_P$ or $TI_A$, it does not affect the tolerance interval, $TI_1$ and $TI_2$ for either location. Embodiments of the invention are also contemplated which do not permit a mandatory shipping quantity (e.g., MR=0). Similarly, embodiments are contemplated in which AQ is infinite. It is also contemplated that embodiments of the invention may use only $TI_P$ or $TI_A$. Still other embodiments of the invention may use the narrowest interval defined by both $TI_P$ and $TI_A$. For example, in FIG. 1, selecting ABS_L as the lower bound and PER_U as the upper bound of the effective tolerance interval. However, having the widest tolerance interval provides the greatest flexibility in rounding and therefore is likely to achieve the most efficient transportation quantities.

Figure 2:
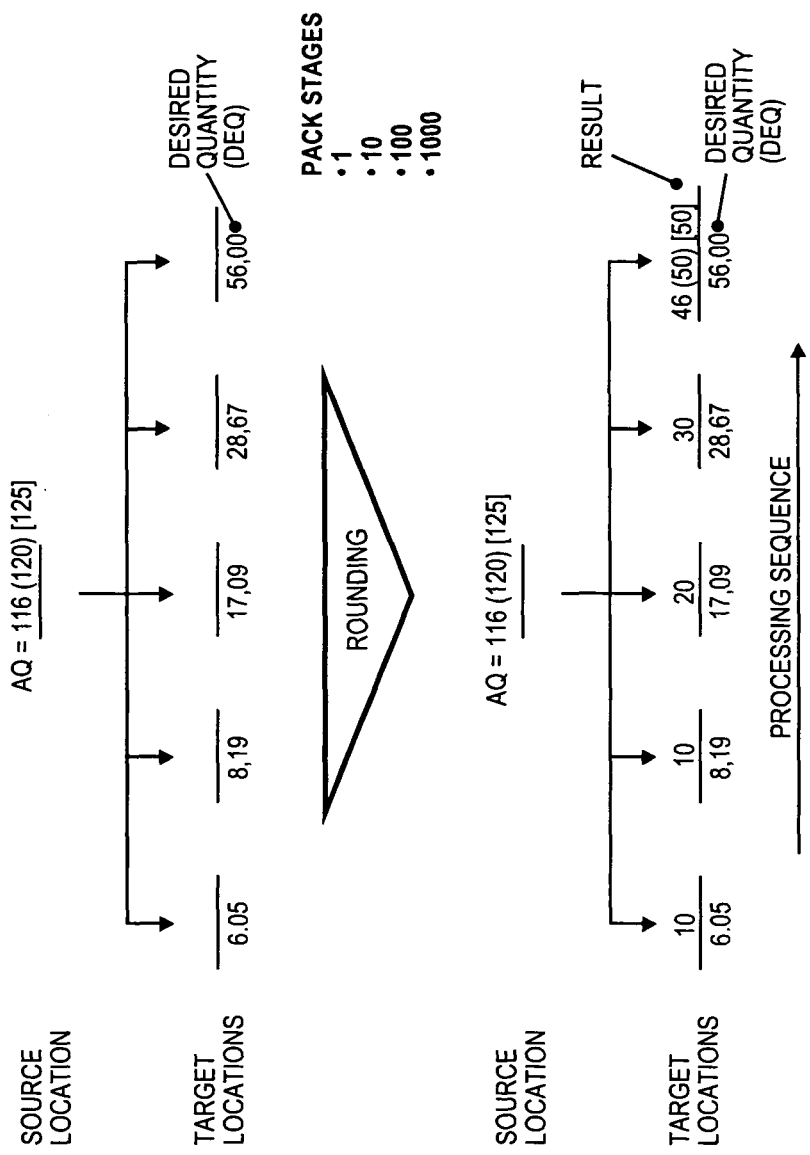
FIG. 2 is a diagram depicting one example of rounding in one embodiment of the invention.

FIG. 2 is a diagram depicting one example of rounding in one embodiment of the invention. In this example, there are four possible pack stages 1, 10, 100 and 1000. The AQ is 116 of the source location. Two other AQ's are shown (and corresponding rounding results) in parentheses and brackets. There are five target locations having desired quantities (DEQ) of 6.05, 8.19, 17.09, 28.67 and 56.00. In this example, the tolerance interval may be plus or minus 15% or plus or minus four units and no mandatory requirements exist. This results in tolerance intervals of 2.05 to 10.05; 4.19 to 12.19; 13.09 to 21.09, 24.37 to 32.97; and 47.6 to 64.4. Because partial units cannot be shipped, the effective tolerance intervals are 3 to 10, 5 to 12, 14 to 21, 25 to 32 and 48 to 64 respectively. For target locations 1-5 respectively. Since the highest possible pack stage in any of these tolerance intervals is a carton (10 units), multiples of a carton are used to fulfill as many target locations as possible. It can be seen from FIG. 2, four of the five target locations have their tolerance interval satisfied with pack stages greater than the minimum pack stage (1 unit in this example).

In one embodiment, the target locations are processed sequentially (from left to right in FIG. 2). Sequential processing results in optimum distribution in a single pass. This is important because in some supply chains upwards of ten million deployment decisions may be required daily. However, the effect of the sequential processing is that target locations earlier in the order are likely to have better rounding results than those deeper in the order. This can be shown relative to target location five for which fifty units would have been five cartons and within its tolerance interval. However, after rounding the first four target locations, the remaining available quantity was insufficient to supply fifty units. Thus, in the example where AQ=116, the fifth target is left short (and outside its tolerance interval). In this example, the soft lower bound of the tolerance interval is violated because at its sequential turn there is insufficient AQ to fall with the TI of the fifth location. In another embodiment, the lower bound of the tolerance interval may be imposed as a hard constraint even where no explicit MR exists. In such an embodiment, the lower bound of the tolerance interval is subtracted from the AQ before rounding is permitted. This reduces the quantity available for rounding and may result in less efficient transportation quantities, than when MR is the only lower hard constraint.

In one embodiment, the sequence of handling target locations may be substantially random. It is preferred to establish the order based on various criteria. Among the criteria, which may be used in establishing a sequence, are forecast demand, lead-time to delivery, planned safety stock at target, order type, demand per day, months of supply (number of months that can be covered by the current quantity on hand) etc. For example, longer lead-time may be given higher priority over shorter lead-time, back orders may be given higher priority than other types of orders. In some embodiments, combinations of such criteria are used as a criterion, e.g., safety stock divided by forecast. In one embodiment, the criteria are ranked in a hierarchical order and the priority of a target location is discerned by comparing the target locations applying each criteria in turn until any ties are broken. In another embodiment, the sequence is predefined and does not vary with changes in such criteria.

With the alternative, AQ=120, the rounding results for the first four locations is the same, the fifth target location is rounded to five cartons, 50 total units which is within its tolerance interval. With the alternative, AQ=125, the fifth target location is again rounded to 50 and five units are retained at the source for a subsequent deployment. From this example, it should be clear that total deployment of AQ is not required in all embodiments of the invention.

Figure 3:
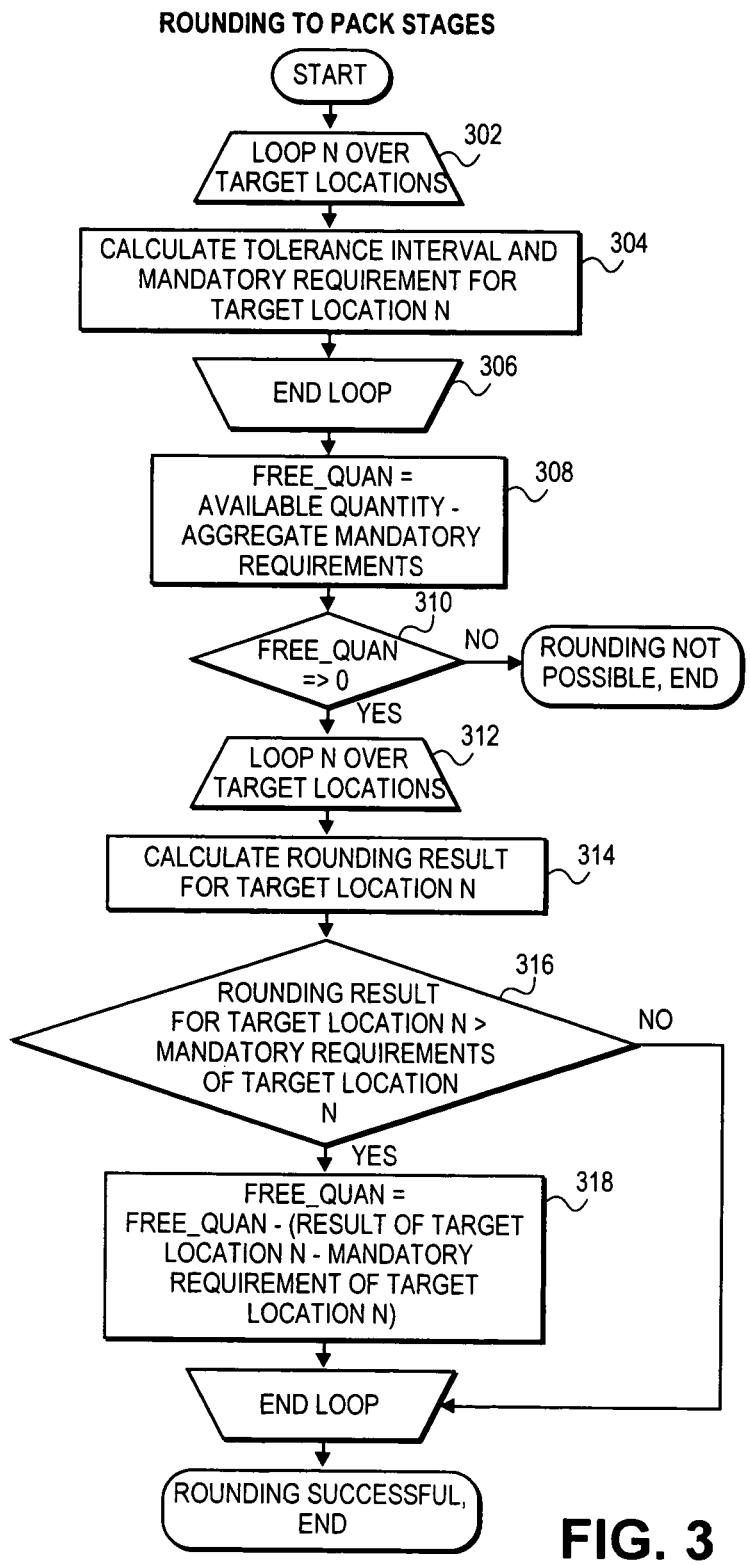
FIG. 3 is a flow diagram of the operation of one embodiment of the invention.

FIG. 3 is a flow diagram of the operation of one embodiment of the invention. At block 302, the routine begins to loop over the n target locations where n is equal to the number of target locations served by a particular source. The target locations are ordered according to the sequence rules described above. At block 304, the tolerance interval is calculated for each of the target locations. Once the tolerance interval for the nth target location is calculated, the loop ends at block 306. At block 308, the free quantity, also referred to as the quantity available for rounding, is calculated by subtracting the aggregate mandatory requirement for the n target locations from the available quantity. In such an embodiment, the lower bound of the TI is deemed a soft constraint if greater than MR. If the free quantity is less than 0 at decision block 310, rounding is not possible and the routine ends. If the free quantity is 0, the target locations receive their individual MR. No further rounding is required in that case. If the free quantity is greater than 0, the routine enters the rounding loop and loops over n locations at block 312. At block 314, a rounding result is calculated for each target location in series. At decision block 316, a determination is made if the rounding result is greater than the mandatory requirement for the target location. If it is, the rounded result less the mandatory requirement for the target location is subtracted from the free quantity at block 318 and the loop ends. Otherwise, the loop ends without subtraction from the free quantity.

Figure 4:
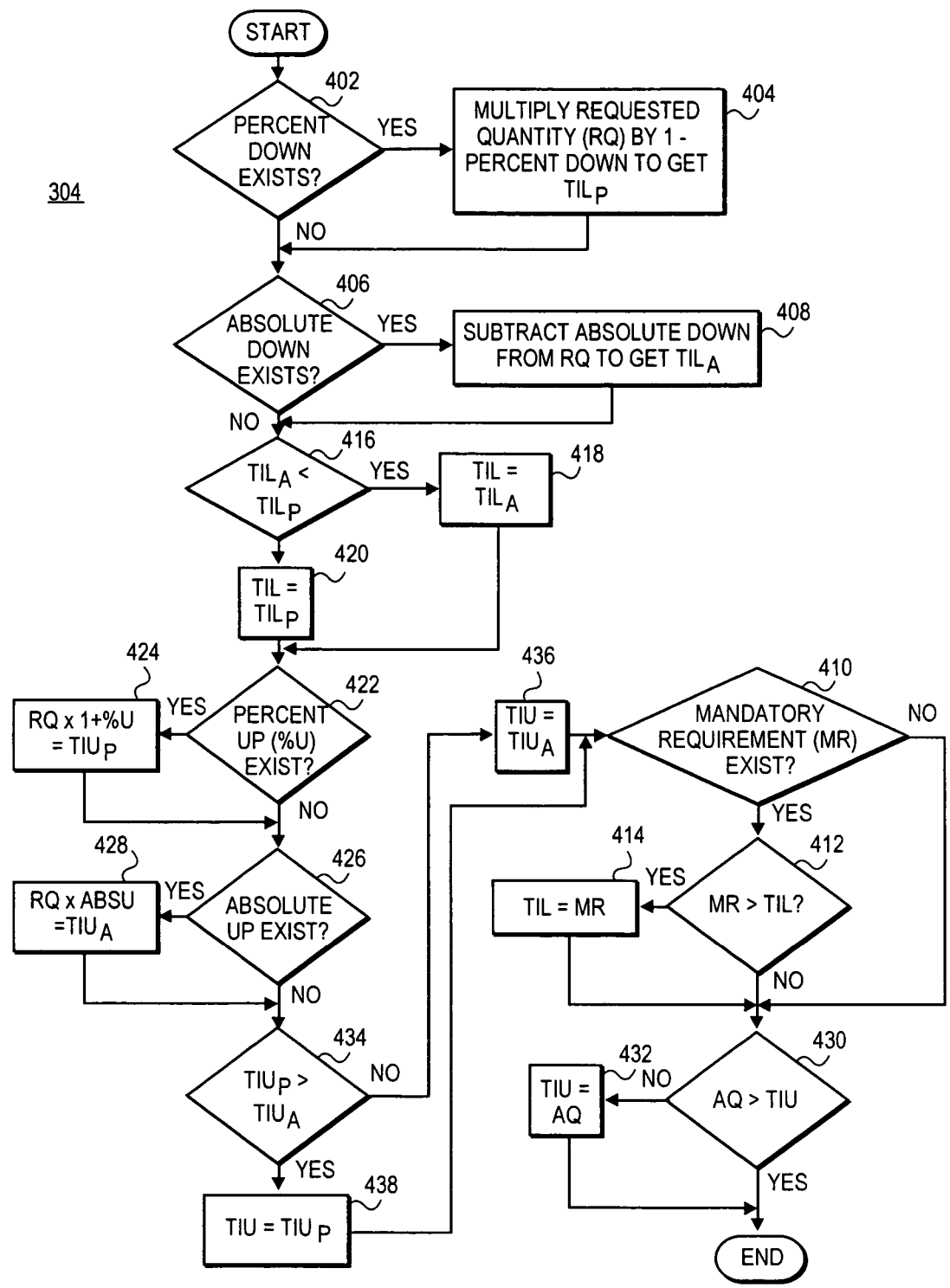
FIG. 4 is a flow chart of a routine to calculate tolerance intervals in one embodiment of the invention.

FIG. 4 is a flow chart of a routine to calculate tolerance intervals in one embodiment of the invention. At decision block 402, the determination is made if a percent down (percent of undershipping) exists. If it does, the requested quantity (RQ) is multiplied by one minus the percent down to get lower bound of the percentage based tolerance interval ($TIL_P$). If a percent down does not exist or after calculating $TIL_P$, a determination is made if an absolute quantity down exists at decision block 406. If it does, the absolute down quantity is subtracted from the RQ to get the lower bound of the absolute tolerance interval ($TIL_A$). If no absolute down quantity exists or after calculation of $TIL_A$, a determination is made at decision block 416 if $TIL_A$ is less than $TIL_P$. If $TIL_A$ is less than $TIL_P$ then the lower bound of the tolerance interval (TIL) is set equal to $TIL_A$ at block 418. If it is not, TIL is equal to $TIL_P$ at block 420.

Once TIL is established at either blocks 414, 418 or 420, a determination is made at decision block 422 whether a percent up (a percentage of overshipping) exists. If it does at block 424, the RQ is multiplied by one plus the percentage up to generate the upper bound of the percentage based tolerance interval ($TIU_P$). If no percentage up exists or after calculation of $TIU_P$ a determination is made at decision block 426 if an absolute up quantity exists. If it does, the upper bound of the absolute tolerance interval is calculated as RQ plus the absolute up quantity. Then at decision block 434 a determination is made whether $TIU_P$ is greater than $TIU_A$. If it is not, the upper bound (TIU) of the tolerance interval is set equal to $TIU_A$ at block 436. If it is, TIU is set equal to $TIU_P$ at block 438.

Once the soft tolerance interval is found, a determination is made if a mandatory requirement (MR) exists for the target location at block 410. If MR exists at decision block 412, a determination is made if MR is less than TIL. If it is not, the lower bound of the tolerance interval for the target location is set equal to MR (TIL=MR). If it is or if no mandatory requirement exists (MR=0). Then at decision block 430, a determination is made if the quantity available is greater than TIU. If it is not, the upper bound of the tolerance interval for the target location (TIU) is equal to AQ at block 432. If AQ is greater than TIU, TIU remains as previously set.

Following this scheme provides the widest possible tolerance interval for subsequent rounding. It should be noted that while this routine is depicted in a flow chart, many of the operations could occur in parallel and such is contemplated as within the scope of the invention. Moreover, the particular ordering of calculation of a percentage-based bound followed by the absolute bound could be reversed, and such is also contemplated. Thus, embodiments of the invention are not constrained by the flow order depicted in FIG. 4. Similarly, for example, determining that $TIU_A$ is less than $TIU_P$ is the same as determining $TIU_P$ is greater than $TIU_A$. Accordingly, the embodiments of the invention are not constrained by a particular logical ordering. Additionally, embodiments of the invention may not employ the widest possible tolerance interval and therefore the selection of upper and lower bound of the tolerance interval may use different logic than the logic employed in FIG. 4. For example, other embodiments of the invention may select the narrowest tolerance interval dictated by the various constraints. Other embodiments may select between the percentage of absolute tolerance interval based on which one was widest without regard to the broadest aggregate tolerance interval. Stated slightly differently, some embodiments of the invention may require that both the upper and lower bound of the tolerance interval come from, for example, either the percentage based tolerance interval ($TI_P$) or the absolute tolerance interval ($TI_A$).

As mentioned above, in one embodiment, the tolerance interval is treated as a hard constraint on shipping quantity. In this embodiment, to calculate the quantity available for rounding rather than subtracting the aggregate MR, an aggregate of the lower bounds of the tolerance intervals is subtracted from AQ to get the free quantity. In an alternative embodiment, the tolerance interval is treated as a soft constraint with the MR providing a hard floor (such as described with reference to FIG. 3). In such an embodiment, target locations later in the sequence may not receive shipping quantities within their tolerance interval, but will receive at least their MR's.

Figure 5:
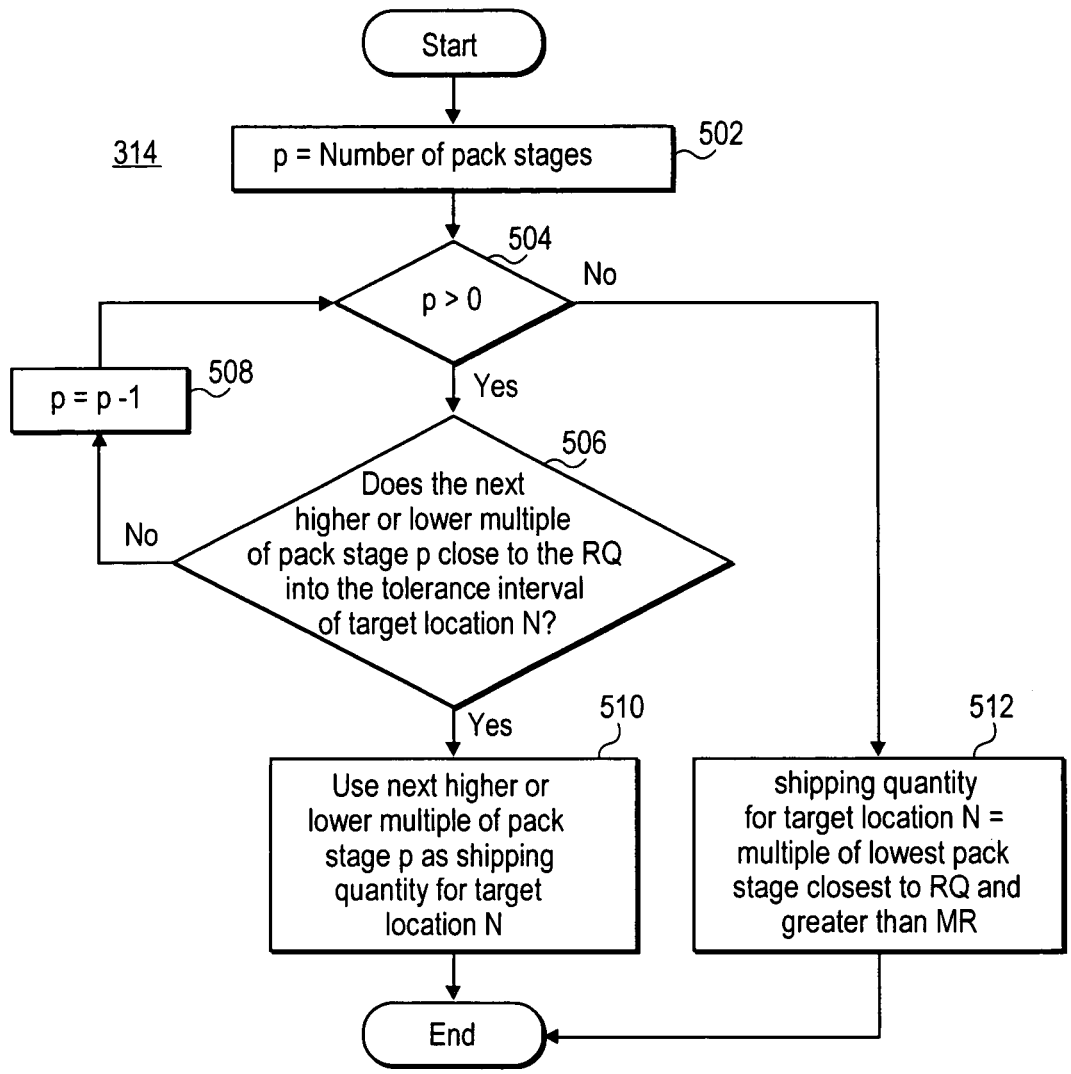
FIG. 5 is a flow diagram of a rounding routine of one embodiment of the invention.

FIG. 5 is a flow diagram of a rounding routine of one embodiment of the invention. At block 502, P is set equal to the highest number of pack stage. For example, if there are five possible pack stages, P is initially set equal to five. A determination is made at decision block 504 where P is greater than 0. If P is greater than 0, a determination is made at decision block 506, if the next higher or lower multiple of pack stage P around the requested quantity falls within the tolerance interval for location N. For example, if location N has requested 200 pieces with a plus or minus 20% tolerance interval, this implies that the tolerance interval between 160 pieces and 240 pieces, the pack stage in question is 1000, the next higher multiple is equal to 1000 and the next lower multiple is equal to 0, neither of which fits into the tolerance interval. In such case, P is decremented by one at block 508. The loop of blocks 504, 506 and 508 continues until a pack stage fitting within the tolerance interval is located at decision block 506. In such case, the nearest multiple within the tolerance interval is selected as the shipping quantity at block 510. For example, the requested quantity is twenty-two pieces plus or minus 20% tolerance interval and the pack stage is equal to 10. Two units of the pack stage (20 pieces) fits within the tolerance interval and would be selected as the shipping quantity at block 510. Alternatively, if the P equals 0 at block 504, it implies that no multiple of an available pack stage falls within the tolerance interval. In such case, a nearest multiple greater than MR is of the lowest permitted pack stage selected as a shipping quantity for target location N at block 512. For example, if the RQ is twenty-four pieces within a ±10% tolerance interval and a minimum pack stage of ten pieces and no MR, the shipping quantity would be selected at twenty pieces. Conversely, if in the same example, MR was twenty-two pieces, the shipping quantity would be selected at thirty two pieces. Once the shipping quantity is selected at block 510 or block 512, the routine ends.

In the following example, there are five target locations having different desired quantities and an available quantity of 118 that needs to be distributed to the five target locations. The pack stages are 1, 10, 50, 250 and 1000. We assume that for each target location the rounded quantity can be 20% higher or lower than the desired quantity of each location.

TABLE 1

|  | Desired Quantity | Mandatory req'ments | Rounded Mandatory req'ments | Shipping Quantity |  | Pcs. |
|---|---|---|---|---|---|---|
| Target loc. 1 | 9.30 | 5.40 |  |  | Pack Stage 1 | 1 |
| Target loc. 2 | 8.19 | 0.00 |  |  | Pack Stage 2 | 10 |
| Target loc. 3 | 17.09 | 0.00 |  |  | Pack Stage 3 | 50 |
| Target loc. 4 | 31.05 | 25.40 |  |  | Pack Stage 4 | 250 |
| Target loc. 5 | 56.00 | 38.45 |  |  | Pack Stage 5 | 1000 |
| Sum | 121.63 | 69.25 |  |  |  |  |
| Available Quantity | 118 |  |  |  |  |  |

First, the tolerance interval and effective mandatory requirements for each target location are calculated. The mandatory requirements need to be rounded up to the next higher multiple of the minimum pack stage (which in this example is 1):

TABLE 2

|  | Desired Quantity | Mandatory req'ments | Rounded Mandatory req'ments | Shipping Quantity |  | Pcs. |
|---|---|---|---|---|---|---|
| Target loc. 1 | 9.30 | 5.40 | 6 |  | Pack Stage 1 | 1 |
| Target loc. 2 | 8.19 | 0.00 | 0 |  | Pack Stage 2 | 10 |
| Target loc. 3 | 17.09 | 0.00 | 0 |  | Pack Stage 3 | 50 |
| Target loc. 4 | 31.05 | 25.40 | 26 |  | Pack Stage 4 | 250 |
| Target loc. 5 | 56.00 | 38.45 | 39 |  | Pack Stage 5 | 1000 |
| Sum | 121.63 | 69.25 | 71 |  |  |  |
| Available Quantity | 118 |  |  |  |  |  |

The percentage tolerance interval is defined by calculating the upper and lower bound for each target location. For target location 1, the upper bound is 9.30+20%=9.30*1.20=11.16, the lower bound is 9.30−20%=9.30*0.80=7.44.

Since, on the one hand, these bounds should not be violated and, on the other hand, decimal quantities can not be shipped, these bounds are rounded up and down to the next multiple of the minimum pack stage. The rounded minimum effective requirement of target location 1 is outside of the percentage tolerance interval, and therefore the minimum effective requirement does not influence the tolerance interval.

| Target location 1 |  |  |
|---|---|---|
| Desired Quantity | 9.30 |  |
| Rounded Mandatory req'ment | 6 |  |
| Free quantity for rounding | 47 |  |
|  |  | from qty to be rounded |
| upper bound | 11.00 | 11.16 |
| lower bound | 8.00 | 7.44 |

The tolerance interval and effective mandatory requirements for the other target locations are calculated likewise.

The calculation of the rounding result for target location 1 starts with a free quantity for rounding of Available quantity−Sum of all rounded mandatory requirements=118−71=47.

First, the highest pack stage (1000) is checked. The multiples of 1000 next to the requirement (9.30) are 0 and 1000. Both values are outside of the tolerance interval. Furthermore, 0 is an invalid option, since the mandatory requirement could not be fulfilled and is a hard constraint. Pack stages 250 and 50 cannot be used for the same reason. Pack stage 10 fits into the tolerance interval and is therefore a valid result.

The shipping quantity for target location 1 is 4 pieces higher than its rounded mandatory requirements. In consequence, the free quantity for rounding for target location 2 is 47−4=43.

All shipping quantities are shown in Table 3:

TABLE 3

| | Desired Quantity | Mandatory req'ments | Rounded Mandatory req'ments | Shipping Quantity | | Pcs. |
|---|---|---|---|---|---|---|
| Target loc. 1 | 9.30 | 5.40 | 6 | 10 | Pack Stage 1 | 1 |
| Target loc. 2 | 8.19 | 0.00 | 0 | 8 | Pack Stage 2 | 10 |
| Target loc. 3 | 17.09 | 0.00 | 0 | 20 | Pack Stage 3 | 50 |
| Target loc. 4 | 31.05 | 25.40 | 26 | 30 | Pack Stage 4 | 250 |
| Target loc. 5 | 56.00 | 38.45 | 39 | 50 | Pack Stage 5 | 1000 |
| Sum | 121.63 | 69.25 | 71 | 118 | | |
| Available Quantity | 118 | | | | | |

For target location 2, only multiples of 1 do not violate the tolerance interval. The result of 20 pieces for target location 3 represents 2 units of package size 10. Accordingly, 30 pieces for target location mean 3 units of package size 10. A single unit of package size 50 can fulfill requirements of target location 5.

TABLE 4

| | Desired Quantity | Mandatory req'ments | Rounded Mandatory req'ments | Shipping Quantity | | Pcs. |
|---|---|---|---|---|---|---|
| Target loc. 1 | 9.30 | 5.40 | 10 | 10 | [Pack Stage 1] | [1] |
| Target loc. 2 | 8.19 | 0.00 | 0 | 10 | Pack Stage 2 | 10 |
| Target loc. 3 | 17.09 | 0.00 | 0 | 20 | Pack Stage 3 | 50 |
| Target loc. 4 | 31.05 | 25.40 | 30 | 30 | Pack Stage 4 | 250 |
| Target loc. 5 | 56.00 | 38.45 | 40 | 40 | Pack Stage 5 | 1000 |
| Sum | 121.63 | 69.25 | 80 | 110 | | |
| Available Quantity | 118 | Free Quantity | 38 | | | |

Table 4 shows the rounding result from the above example with the additional constraint that no pack stage smaller than 10 pieces (Pack Stage 2) may be shipped. In this example, the shipping quantity for both target location 2 and target location 5 violates their respective tolerance intervals. However, the hard constraints MR and minimum pack stage are satisfied. This illustrates an additional case where the shipping quantity may be outside the tolerance interval. In the case of target location 2, both nearest multiples of the lowest allowed pack stage are outside the tolerance interval, but 1 unit of the smallest permitted pack stage is closest to the desired quantity and satisfies all hard constraints and is therefore selected.

In one embodiment, the minimum pack stage may vary between target locations. To provide a real world example, a retail store may be willing/able to accept a carton of a product while a distribution center (served by the same source) may only accept a pallet layer or greater. In the above example, if only target location 2 required a minimum pack stage of 10, the results would be as in Table 4 except the shipping quantity for target location 5 would be 48 pieces. Conversely, if all but target location 2 required a minimum pack stage of 10, the result would be exactly as depicted in Table 3 above (with the rounded MR as shown in Table 4). In other embodiments, the entire pack stage definition may be different between targets of a source. For example, one source may serve targets in both the United States and in Europe. Pack stages for the U.S. targets may be in multiples of a dozen while European pack stages may be in multiples of ten.

Figure 6:
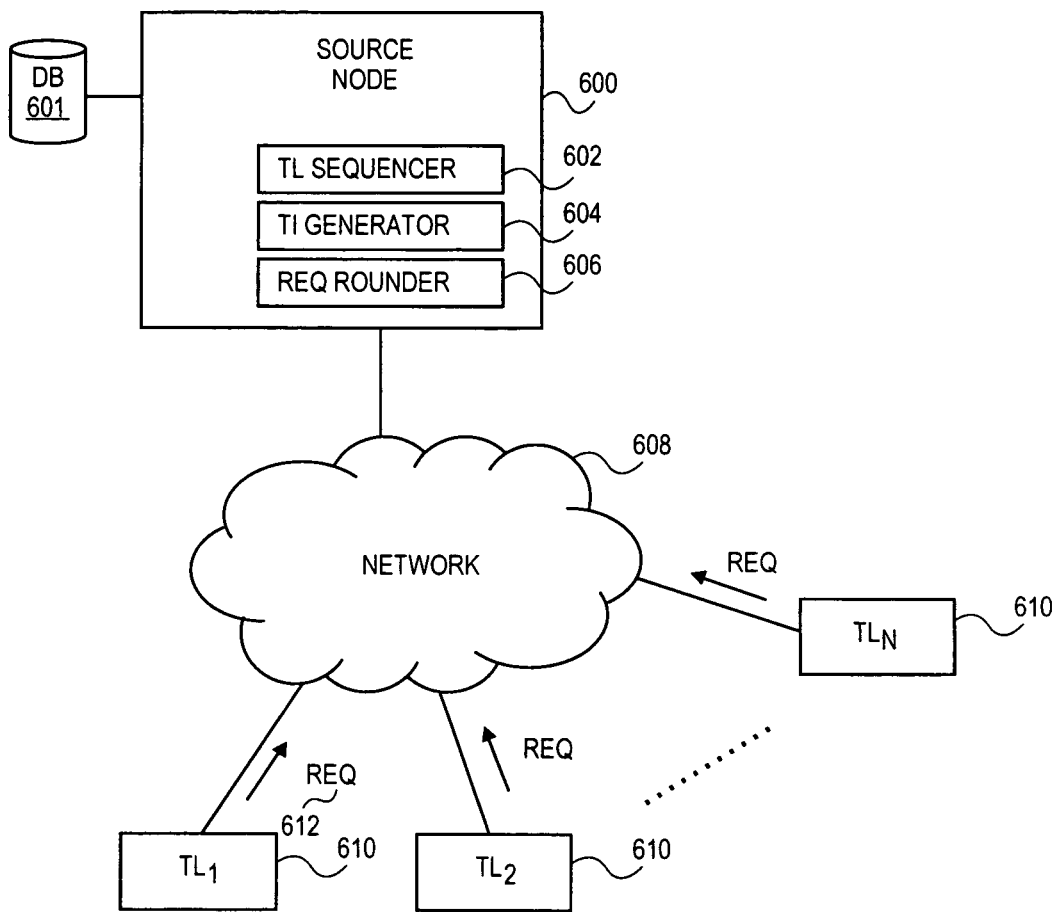
FIG. 6 is a block diagram of a system employing one embodiment of the invention.

FIG. 6 is a block diagram of a system employing one embodiment of the invention. A rounding node 600 is coupled by a distributed network 608 to a number of target location nodes 610. Target location nodes 610 send, for example, inventory and sales data and/or deployment requests across network 608 to rounding node 600 to facilitate DRP and deployment decision making. Rounding node 600 includes a target location sequencer 602, a tolerance interval generator 604 and desired quantities rounder 606. These may be instantiated as software routines residing in any computer readable storage medium, including volatile and non-volatile memory, magnetic media, optical media, etc.

Target location sequencer 602 is responsible for arranging the target location into a sequence for serial processing in the course of the rounding operation. Notably, the same two target locations may reside in different orders on different days depending on various criteria such as those noted above. Thus, for example, target location one may hold the first position on Monday, while target location two holds the first position on Tuesday as a result of an increase number of back orders at target location two between the two deployment decisions.

Tolerance interval generator 604 establishes tolerance intervals for each of the target locations. A tolerance interval of any particular target location need not depend on any other target location. Request rounder 606 calculates a rounded value serially for the target locations to improve transportation and handling efficiencies by finding rounded values which employ more efficient pack stages to satisfy deployment requirements or in the case of DRP, expected deployment. In one embodiment, a database 601 coupled to the source node 600 is used to store a tolerance interval definition to supply the tolerance interval generator 604. The database 601 may also be used to store the pack stages available from the source location. In one embodiment, the rounding node is centralized for an enterprise. In such an embodiment, the calculation of shipping quantity is converted to a transport order and distributed to one of a plurality of source locations within the enterprise. In an alternative embodiment, rounding nodes are distributed at the plurality of source location for the enterprises and generate and transport orders locally.

While most of the foregoing discussion revolves around rounding for purposes of deployment, as alluded to above and explicitly stated in various cases, this rounding scheme may be employed in other contexts, such as DRP, in an effort to derive more an efficient allocation of quantifies during the planning stages of supply chain management.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer implemented method comprising:
    defining a tolerance interval for a target location;
    rounding, by a computer, a requested quantity to a shipping quantity within the tolerance interval of the target location, the shipping quantity having efficient transportation characteristics;
    persistently storing the shipping quantity in a computer readable form;
    arranging a plurality of target locations in a sequence; and
    wherein a tolerance interval is defined for each target location and the rounding is performed sequentially.

2. The method of claim 1 wherein arranging comprises:
    analyzing a plurality of criteria to establish a priority of target locations.

3. The method of claim 2 wherein the criteria comprises at least one of:
    lead time to delivery, forecast demand at target, planned safety stock at target and order type.

4. A computer implemented method comprisinq:
    defining a tolerance interval for a target location;
    rounding, by computer, a requested quantity to a shipping quantity within the tolerance interval of the target location, the shipping quantity having efficient transportation characteristics; and
    persistently storing the shipping quantity in a computer readable form
    wherein defining a tolerance interval includes
    finding an upper bound for distribution to each target location; and
    finding a lower bound for distribution to each target location by selecting the higher of i) a mandatory requirement for a target location or ii) a lowest of an allowed percentage reduction from a requested quantity and an allowed absolute reduction from the requested quantity.

5. A computer implemented method comprising:
    defining a tolerance interval for a target location;
    rounding, by a computer, a requested quantity to a shipping quantity within the tolerance interval of the target location, the shipping quantity having efficient transportation characteristics; and
    persistently storing the shipping quantity in a computer readable form
    wherein defining a tolerance interval includes
    finding an upper hound for distribution to each target location by selecting the lower of i) a maximum available quantity or ii) a higher of an allowed percentage increase in a requested quantity and an allowed absolute increase from the requested quantity and
    finding a lower bound for distribution to each target location.

6. The method of claim 1 wherein rounding comprises:
    choosing a minimal set of pack stages having a maximum number of higher quantity pack stages to fall within the tolerance interval of each target location in sequence.

7. The method of claim 1 wherein rounding sequentially comprises:
    finding a set of pack stages having a quantity that falls within the tolerance interval for a current target location, the set having a minimum number of higher value pack stages;
    subtracting the quantity from a then available quantity; and
    repeating the finding and subtracting for a next target location until a quantity for each target location is found.

8. The method of claim 1 further comprising:
    subtracting a sum of mandatory requirements for the target locations from a maximum available quantity to obtain an available rounding quantity.

9. A computer readable storage media containing executable instructions which when executed cause a digital processing system to perform operations comprising:
    defining a tolerance interval for a target location;
    rounding a requested quantity to a shipping quantity within the tolerance interval of the target location, the shipping quantity having efficient transportation characteristics;
    persistently storing the shipping quantity in a computer readable form
    arranging a plurality of target locations in a sequence; and
    wherein a tolerance interval is defined for each target location and the rounding is performed sequentially.

10. The computer readable storage media of claim 9 having executable instructions which when executed cause a digital processing system to perform operations further comprising:
    finding an upper bound for distribution to each target location; and
    finding a lower bound for distribution to each target location.

11. The computer readable storage media of claim 10 having executable instructions which when executed cause a digital processing system to perform operations further comprising:
    selecting the higher of i) a mandatory requirement for a target location or ii) a lowest of an allowed percentage reduction from a requested quantity and an allowed absolute reduction from the requested quantity.

12. The computer readable storage media of claim 10 having executable instructions which when executed cause a digital processing system to perform operations further comprising:
    selecting the lower of i) a maximum available quantity or ii) a higher of an allowed percentage increase in a requested quantity and an allowed absolute incrcase from the requested quantity.

13. The computer readable storage media of claim 9 having executable instructions which when executed cause a digital processing system to perform operations further comprising:
    finding a set of pack stages having a quantity that falls within the tolerance interval for a current target location, the set having a minimum number of higher value pack stages;
    subtracting the quantity from a then available quantity; and
    repeating the finding and subtracting for a next target location until a quantity for each target location is found.

14. The computer readable storage media of claim 9 which when executed cause a digital processing system to perform a method further comprising:
    subtracting a sum of mandatory requirements for the target locations from a maximum available quantity to obtain an available rounding quantity.

* * * * *